(12) United States Patent
Shaw et al.

(10) Patent No.: US 8,781,825 B2
(45) Date of Patent: Jul. 15, 2014

(54) REDUCING FALSE POSITIVES IN SPEECH RECOGNITION SYSTEMS

(75) Inventors: Jonathan Shaw, Oregon City, OR (US);
Pieter Vermeulen, Portland, OR (US);
Stephen Sutton, Portland, OR (US);
Robert Savoie, Los Altos, CA (US)

(73) Assignee: Sensory, Incorporated, Santa Clara, CA (US)

( * ) Notice: Subject to any disclaimer, the term of this patent is extended or adjusted under 35 U.S.C. 154(b) by 180 days.

(21) Appl. No.: 13/217,134

(22) Filed: Aug. 24, 2011

(65) Prior Publication Data
US 2013/0054242 A1    Feb. 28, 2013

(51) Int. Cl.
*G10L 15/00* (2013.01)
*G10L 17/00* (2013.01)
*G10L 15/04* (2013.01)
*G10L 15/28* (2013.01)

(52) U.S. Cl.
USPC ........... 704/231; 704/234; 704/235; 704/236; 704/237; 704/238; 704/239; 704/240; 704/246; 704/251; 704/252; 704/253; 704/254; 704/255

(58) Field of Classification Search
USPC ......... 704/231, 234, 236–240, 251–255, 235, 704/246
See application file for complete search history.

(56) References Cited

U.S. PATENT DOCUMENTS

| | | | | |
|---|---|---|---|---|
| 4,837,831 A | * | 6/1989 | Gillick et al. | 704/245 |
| 5,193,142 A | * | 3/1993 | Zhao | 704/200 |
| 5,329,608 A | * | 7/1994 | Bocchieri et al. | 704/243 |
| 5,390,278 A | * | 2/1995 | Gupta et al. | 704/243 |
| 5,794,198 A | * | 8/1998 | Takahashi et al. | 704/256 |
| 5,893,059 A | * | 4/1999 | Raman | 704/256.2 |
| 6,138,095 A | * | 10/2000 | Gupta et al. | 704/234 |
| 6,223,155 B1 | * | 4/2001 | Bayya | 704/243 |
| 6,266,633 B1 | | 7/2001 | Higgins et al. | |
| 6,389,395 B1 | * | 5/2002 | Ringland | 704/254 |
| 6,724,866 B2 | | 4/2004 | Kuhn et al. | |
| 6,959,278 B1 | * | 10/2005 | Shu et al. | 704/243 |
| 7,319,960 B2 | * | 1/2008 | Riis et al. | 704/256.4 |
| 7,529,665 B2 | * | 5/2009 | Kim et al. | 704/236 |
| 7,657,433 B1 | * | 2/2010 | Chang | 704/252 |
| 2001/0025242 A1 | | 9/2001 | Joncour | |
| 2005/0171775 A1 | * | 8/2005 | Doyle | 704/250 |
| 2005/0209851 A1 | * | 9/2005 | Shu et al. | 704/246 |
| 2006/0136206 A1 | * | 6/2006 | Ariu et al. | 704/246 |
| 2006/0136207 A1 | * | 6/2006 | Kim et al. | 704/249 |

(Continued)

OTHER PUBLICATIONS

Yingna Chen;Tao Hou;Sha Meng;Shan Zhong;Jia Liu, A New Framework for Large Vocabulary Keyword Spotting Using Two-Pass Confidence Measure, 2006, IEEE, pp. 68-71.*

(Continued)

*Primary Examiner* — Edgar Guerra-Erazo
(74) *Attorney, Agent, or Firm* — Fountainhead Law Group, PC

(57) ABSTRACT

Embodiments of the present invention improve methods of performing speech recognition. In one embodiment, the present invention includes a method comprising receiving a spoken utterance, processing the spoken utterance in a speech recognizer to generate a recognition result, determining consistencies of one or more parameters of component sounds of the spoken utterance, wherein the parameters are selected from the group consisting of duration, energy, and pitch, and wherein each component sound of the spoken utterance has a corresponding value of said parameter, and validating the recognition result based on the consistency of at least one of said parameters.

18 Claims, 2 Drawing Sheets

200

(56) References Cited

U.S. PATENT DOCUMENTS

2007/0124145 A1* 5/2007 Luan et al. .................. 704/254
2010/0223056 A1* 9/2010 Kadirkamanathan ......... 704/235
2011/0004473 A1    1/2011 Laperdon et al.

OTHER PUBLICATIONS

Shilei Huang;Xiang Xie;Jingming Kuang, Novel Method to Combine Phone-level Confidence Scores Using Support Vector Machines, 2006, IEEE, vol. 1.*

Joseph Keshet;David Grangier;Samy Bengio, Discriminative keyword spotting, 2008, Science Direct, pp. 317-329.*

Hamed Ketabdar;Jithendra Vepa;Samy Bengio;Hervé Bourlard, Posterior based keyword spotting with a priori thresholds, 2006, Prof. of Interspeech, pp. 1-4.*

Myoung-Wan Koo;Sun-Jeong Lee, An Utterance Verification System Based on Subword Modeling for a Vocabulary Independent Speech Recognition System, 1999, EuroSpeech, pp. 1-4.*

Matsui, T.; Furui, S., "Concatenated phoneme models for text-variable speaker recognition," Acoustics, Speech, and Signal Processing, 1993. ICASSP-93., 1993 IEEE International Conference on , vol. 2, No., pp. 391,394 vol. 2, Apr. 27-30, 993.*

International Search Report mailed Jan. 31, 2013 from International Application No. PCT/US2012/051345.

* cited by examiner

REDUCING FALSE POSITIVES IN SPEECH RECOGNITION SYSTEMS

BACKGROUND

The present invention relates to speech recognition, and more particularly, to systems and methods of improving speech recognition using duration and energy.

With the exploding availability of handheld devices and shrinking device sizes, speech recognition is becoming an increasingly valuable technology to support seamless user interaction with electronic systems. However, building accurate recognition systems is extremely challenging. Highly accurate recognition systems can be computationally intensive and not suitable for small handheld electronic devices.

One problem with some speech recognizers occurs when the recognizer generates false accepts. In this case, a recognizer may generate an output indicating that a particular word or phrase has been recognized, when in fact the word or phrase was not actually spoken. This phenomena is sometimes found in word spotting recognizers, which are configured to receive a stream of sounds and pick out ("spot") particular sounds in the stream.

The present invention solves these and other problems with systems and methods of performing speech recognition using duration and energy.

SUMMARY

Embodiments of the present invention improve methods of performing speech recognition. In one embodiment, the present invention includes a method comprising receiving a spoken utterance, processing the spoken utterance in a speech recognizer to generate a recognition result, determining consistencies of one or more parameters of component sounds of the spoken utterance, wherein the parameters are selected from the group consisting of duration, energy, and pitch, and wherein each component sound of the spoken utterance has a corresponding value of said parameter, and validating the recognition result based on the consistency of at least one of said parameters.

DETAILED DESCRIPTION

Described herein are techniques for performing speech recognition using duration and energy. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1:
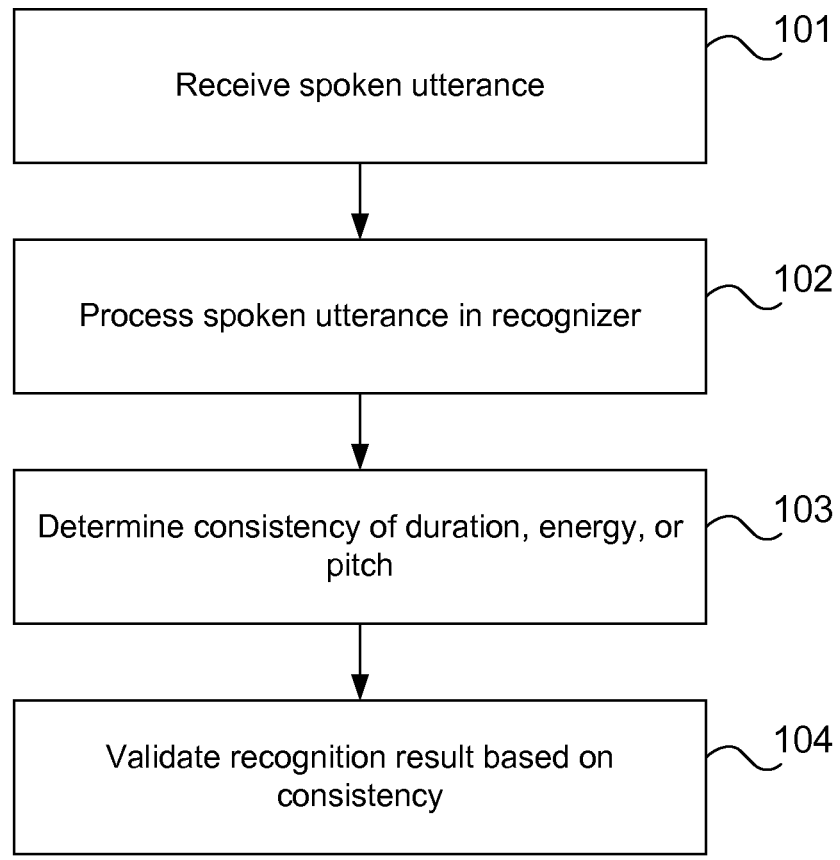
FIG. 1 illustrates a method for performing speech recognition according to one embodiment of the present invention.

FIG. 1 illustrates a method for performing speech recognition according to one embodiment of the present invention. Embodiments of the present invention monitor particular parameters of user utterances received in a recognizer to improve speech recognition results. In particular, embodiments of the present invention reduce false accepts by identifying inconsistencies in recognition results that are unrealistic results for real speech. For example, a recognizer may be listening for the word "hot", and the 'h' may take 10 ms, the left hand part of the 'o' may take 10 ms, the right hand part of the 'o' may take 400 ms, and the 't' make take 100 ms. Real speech occurs at a more consistent rate than this. Similarly, the 'h' and the left side of the 'o' may be very loud, while the rest of the utterance is very quiet. This inconsistency is also a very unrealistic form of real speech. Finally, recognized speech may start at a high pitch, commonly associated with women, and drop to a low pitch, commonly associated with men. This inconsistency is similarly unrealistic. Existing recognizers would not identify such unrealistic results because previous recognizers apply duration modeling for each segment independently and do not enforce consistency across a broader context. Statistics used for duration models, for example, are typically speaker independent and not very precise for a specific speaker. If the system can include additional information about consistency of duration, energy, or pitch to the recognizer, then the recognizer should false accept much less frequently.

FIG. 1 illustrates a process according to one embodiment. At 101 a spoken utterance is received. At 102, the spoken utterance is processed in a recognizer to perform speech recognition. In some embodiments, a recognizer may be an application specific unit of hardware for performing speech recognition, such as a microprocessor, microcontroller, or application specific integrated circuit (ASIC) optimized for speech recognition, for example. In other embodiments, a recognizer may be implemented in software including instructions executable on a processor. For example, a recognizer may be implemented as software and executed on a general purpose microprocessor or microcontroller, for example. At 103, the consistency of duration, energy, or pitch is determined. For example, the spoken utterance may be analyzed on a component basis. For example, the spoken utterance may be analyzed based on sub-phones, phonemes, syllables, or even words. If sub-phones are used, segments of the spoken utterance may be analyzed to determine which sub-phone each segment corresponds to. As a further example, if the speaker says the word "hot", then the system may determine that the segments of sound for "hot" are the phonemes for "h"-"o"-"t". The system may determine consistency of the duration, energy, or pitch across the components of sound. At 104, recognition results are validated based on consistency. For example, if the recognizer generates a recognition result indicating a particular word or phrase that was recognized, then the recognition result may be validated based on consistency of one or more of the duration, energy, or pitch parameters of the spoken utterance. In particular, if the duration, for example, is determined to be inconsistent, then the recognition result is not valid and may be rejected.

Figure 2:
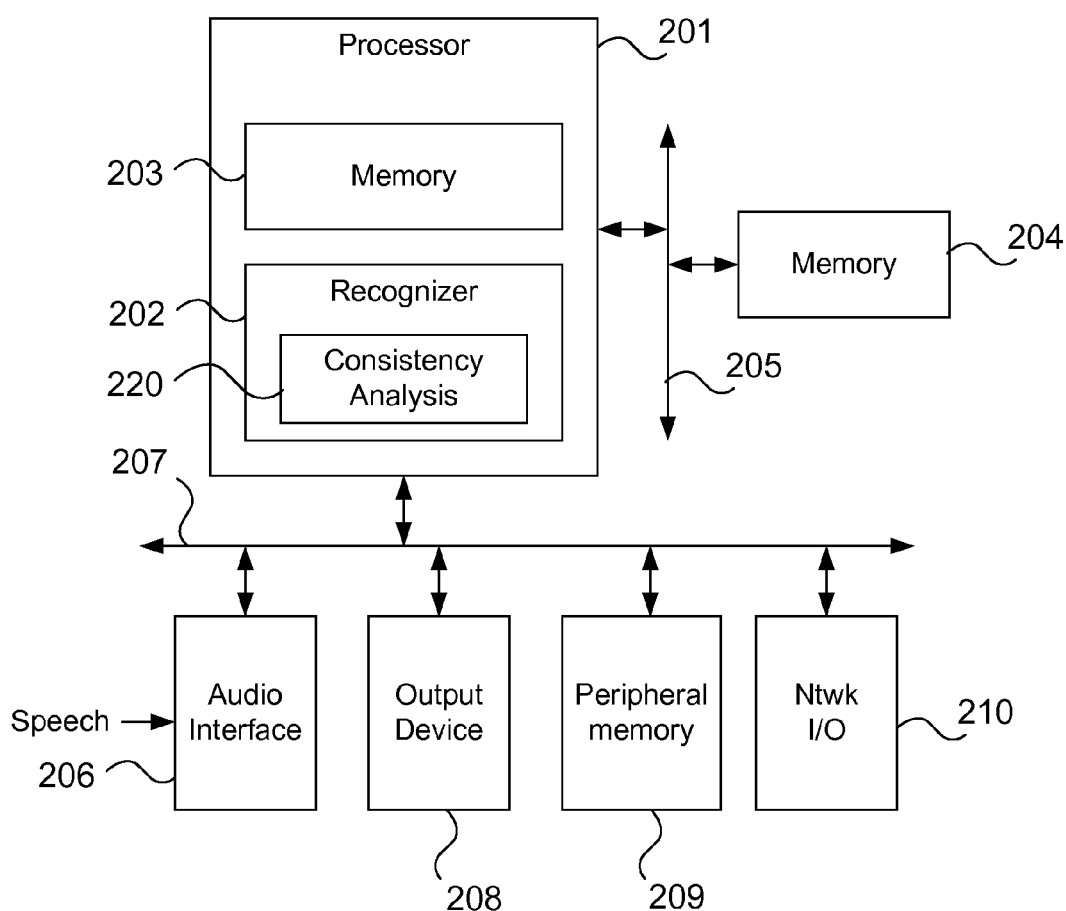
FIG. 2 illustrates a system for implementing speech recognition according to one embodiment of the present invention.

FIG. 2 illustrates a system according to one embodiment. System 200 includes a processor 201 including internal memory 203. Internal memory 203 may include registers, cache, or static random access memory (SRAM), for example, for local data storage and retrieval. Processor 201 may further store and retrieve data from external memory 204 over bus 205, for example. External memory 204 may be a dynamic random access memory, for example. Processor may further store and retrieve data from peripheral memory 209, which may be a hard disk drive or solid state memory, for example. System 200 may include a network interface 210 for communicating with other resources, for example. Interface 210 may be a wireless such as a Bluetooth interface, Cellular interface, IEEE 802 based interface, for example, or wired interface such as an Ethernet, USB, or optical interface, for example. In some embodiments, data used in the recognition process may be stored externally and accessed through interface 210.

In this example, processor 201 includes a recognizer 202 implemented as software for programming the processor to perform the process techniques of determining consistency and validating recognition results described herein. Recognizer 202 may include executable instructions the cause the processor to perform recognition operations on input speech, determine consistency of duration, energy, and pitch, and validate recognition results. In this example, consistency analysis 220 may be performed by one or more components of recognizer 202. In other embodiments, consistency analysis 220 may be separate software from recognizer 202, for example.

Spoken utterances are received in the system through an audio interface 206. Audio interface 206 may include a microphone or other form of audio-to-electronic converter to convert sound signals into electronic signals. Audio interface 206 may include an analog to digital converter for converting an analog audio signal into a digital signal. A digital representation of the spoken utterance may be coupled to processor 201 or stored in memory 209 across bus 207, for example, and accessed by processor 201. Recognizer 202 processes the digital representation of the spoken utterance to produce recognition results. Recognition results may include intermediate recognition results or final recognition results. Final recognition results represent a word or phrase that the recognizer concludes was embodied by the spoken utterance. Types of final and intermediate results may vary depending on the recognition algorithm being used. Intermediate results may be probabilities of components of sound (e.g., phones) generated during the recognition process and may be stored in internal memory 203 or DRAM 204, for example. As described in more detail below, determining consistency and validating recognition results may occur on either intermediate recognition results or final recognition results, or both, for example.

In some embodiments, the consistency of one parameter may be determined. In other embodiments, consistencies of multiple parameters may be determined. For example, in one embodiment, the consistency of duration of component sounds of the spoken utterance may be determined. In this case consistency of duration of sub-phones, for example, across the spoken utterance may be determined relative to expected values of the sub-phones recognized in the spoken utterance. In another embodiment, the consistency of energy (or alternatively, pitch) of component sounds of the spoken utterance may be determined. In the case of energy, consistency of energy of sub-phones, for example, across the spoken utterance may be determined.

In another embodiment, consistencies for a plurality of parameters are determined, and validating the recognition result is based on the separate consistency of each determined parameter. For instance, consistency of duration and energy may be determined, and validation may be based on both consistencies.

In one embodiment, the recognition result is a score and consistencies each have a score. In this case, validating the recognition result may include combining the recognition result score with consistency scores to generate a combined score and comparing the combined score to a threshold, for example.

In another embodiment, consistency may be validated as follows. A particular consistency for a particular parameter (i.e., duration, energy, pitch) is compared to a threshold. If a consistency of a parameter crosses the threshold, the recognition result is rejected, and if the consistency for the parameter does not cross the threshold, the recognition result is accepted. For instance, if the consistency of the parameter crosses the threshold, then the parameter is insufficiently consistent, and if the consistency of the parameter does not cross the threshold, then the parameter is sufficiently consistent. In some embodiments, consistency may be calculated as a number and compared to another number. A variety of techniques may be used to determine consistency. Using some techniques, a high score may correspond to an inconsistent parameter. Thus, if the score is above a threshold, the recognition result is rejected. Other techniques may have high scores that correspond to consistent parameters, for example, and thus if the score is below a threshold, the recognition result is rejected.

Example Implementations of Determining Consistency

In one example implementation, determining consistency of duration includes determining a speaker rate. A consistency score may be based on the speaker rate, actual durations of component sounds of a spoken utterance, and one or more statistical parameters for each component sound in the utterance. As a specific example, the speaker rate may be based on a total duration of the spoken utterance divided by a sum of expected values of durations for each different component of sound in the utterance. For example, if a user speaks the word "TO", then the component sounds, which are phonemes here, may be phoneme sounds for "T" and "O". The duration of the portion of the utterance corresponding to the "T" sound may be 100 ms and the duration of the portion of the utterance corresponding to the "O" sound may be 200 ms. Accordingly, the total duration of the spoken utterance is 300 ms. In one embodiment, expected values may be averages. During training, it may be determined that the duration of the "T" sound ranges from 100-200 ms, with an average duration, Tave, of 150 ms. Similarly, it may be determined that the duration of the "O" sound ranges from 200-300 ms, with an average duration, Oave, of 250 ms. Thus, in this example, the speaker rate, SR, may be calculated as follows:

$$SR=\text{total duration/sum(expected durations)}$$

$$SR=(100\text{ ms}+200\text{ ms})/(150\text{ ms}+250\text{ ms})=3/4$$

In the current example, speaker rate may be used to determine a consistency score. For example, the modified expected values may be determined by multiplying the speaker rate by the expected values of durations for each different component of sound of the utterance. In this example, modified expected values may be determined based on the speaker rate as follows:

$$T'\text{ave}=T\text{ave}*SR \text{ and } O'\text{ave}=O\text{ave}*SR,$$

$$T'\text{ave}=(150\text{ ms})(3/4)=112.5,$$

$$O'\text{ave}=(250\text{ ms})(3/4)=187.5,$$

where T'ave is the modified expected value of Tave and O'ave is the modified expected value of Oave.

Determining consistency (e.g., a consistency score) may include determining delta values. In one embodiment, the delta values are differences between each modified expected value and a duration of a component of sound corresponding each particular modified expected value. For example, delta values may be calculated for each component as follows:

$$T\_delta = T\text{ave} - Ta, \quad (1)$$

$$O\_delta = O'\text{ave} - Oa, \quad (2)$$

where Ta is the actual duration of the "T" component of the utterance and Oa is the actual duration of the "O" component of the utterance. In some embodiments, delta values may be differences between a first function operable on each modified expected value and a second function operable on a duration of a component of sound corresponding each particular modified expected value. For example, another delta value that may be used is as follows:

$$T\_delta = \ln(T'\text{ave}) - \ln(Ta), \quad (3)$$

$$O\_delta = \ln(O'\text{ave}) - \ln(Oa), \quad (4)$$

where the first and second functions are both natural logarithms.

As yet another example, another delta value that may be used is as follows:

$$T\_delta = \ln(T'\text{ave}*\exp(\tfrac{1}{2}(\text{std\_dev}^2))) - \ln(Ta), \quad (5)$$

$$O\_delta = \ln(O'\text{ave}*\exp(\tfrac{1}{2}(\text{std\_dev}^2))) - \ln(Oa), \quad (6)$$

where $\text{std\_dev}^2$ is the standard deviation of the log of the durations of the component sounds, which in this example are phonemes "T" and "O", and "exp" is the exponential function, $e^x$. Thus, in this example, the second function includes an exponential of a standard deviation of the duration of the component of sound corresponding to each particular modified expected value.

In some example implementations, consistency may be represented as a score, and where determining the consistency further comprises adding squares of the delta values for N components of sound in the utterance and dividing by N, where N is an integer. One example, using (1) and (2) above is as follows:

$$S = (1/N)*[T\_delta]^2 + (1/N)*[O\_delta]^2, \text{ where } N=2. \quad (7)$$

Applying equations (1), (2), and (7), a consistency score of S=156.25 is obtained. In one embodiment, the consistency score may be compared to a threshold, and if the score crosses the threshold the recognition result is rejected. In this case, the actual values of "T" and "O" were both fast (e.g., Ta=100 ms where Tave=150 ms is a quickly spoken "T" sound, and Oa=200 ms where Oave=250 ms is a quickly spoken "O" sound). In this case, both the "T" and the "O" are fast, which is consistent. Thus, the consistency score is below some preset threshold and the recognition result is validated.

Another example pertaining to a fast "T" and slow "O" is now presented to show how the consistency score changes. In this example, the following values are used to actual durations of spoken utterances: Ta=100 ms and Oa=300 ms. In this case, the speaker rate is:

$$SR = (100 \text{ ms} + 300 \text{ ms})/(150 \text{ ms} + 250 \text{ ms}) = 4/4 = 1.$$

The modified expected values are:

$$T'\text{ave} = (150 \text{ ms})(1) = 150, \text{ and}$$

$$O'\text{ave} = (250 \text{ ms})(1) = 250.$$

The delta values are:

$$T\_delta = T'\text{ave} - Ta = 150 - 100 = 50, \text{ and}$$

$$O\_delta = O'\text{ave} - Oa = 250 - 300 = 50.$$

The consistency score is:

$$S = (1/N)*[T\_delta]^2 + (1/N)*[O\_delta]^2 = (50^2 + 50^2)/2 = 2500.$$

If the threshold is set between 156.25<Th<2500, where Th is the threshold, the system will reject recognition results for the spoken utterance Ta=100 ms and Oa=300 ms.

Another example pertaining to a slow "T" and slow "O" is now presented to illustrate another case. In this example, the following values are used to actual durations of spoken utterances: Ta=200 ms and Oa=300 ms, where both Ta and Oa are longer in duration than statistical averages from a training corpus, for example. In this case, the speaker rate is:

$$SR = (200 \text{ ms} + 300 \text{ ms})/(150 \text{ ms} + 250 \text{ ms}) = 5/4.$$

The modified expected values are:

$$T'\text{ave} = (150 \text{ ms})(5/4) = 187.5, \text{ and}$$

$$O'\text{ave} = (250 \text{ ms})(5/4) = 312.5.$$

The delta values are:

$$T\_delta = T'\text{ave} - Ta = 187.5 - 200 = 12.5, \text{ and}$$

$$O\_delta = O'\text{ave} - Oa = 312.5 - 300 = 12.5.$$

The consistency score is:

$$S = (1/N)*[T\_delta]^2 + (1/N)*[O\_delta]^2 = (12.5^2 + 12.5^2)/2 = 156.25,$$

which is the same result for the fast-fast case. Thus, recognition results for a consistently slow speaker will produce a consistency score below the threshold, Th, and the results will be validated.

Another example pertaining to a slow "T" and fast "O" is now presented to illustrate another case. In this example, the following values are used to actual durations of spoken utterances: Ta=200 ms and Oa=200 ms, where Ta is longer in duration than the statistical average and Oa is shorter in duration than the statistical average. In this case, the speaker rate is:

$$SR = (200 \text{ ms} + 200 \text{ ms})/(150 \text{ ms} + 250 \text{ ms}) = 4/4 = 1.$$

The modified expected values are:

$$T'\text{ave} = (150 \text{ ms})(1) = 150, \text{ and}$$

$$O'\text{ave} = (250 \text{ ms})(1) = 250.$$

The delta values are:

$$T\_delta = T'\text{ave} - Ta = 150 - 200 = 50, \text{ and}$$

$$O\_delta = O'\text{ave} - Oa = 250 - 200 = 50.$$

The consistency score is:

$$S = (1/N)*[T\_delta]^2 + (1/N)*[O\_delta]^2 = (50^2 + 50^2)/2 = 2500.$$

which is the same result for the fast-slow case. Thus, recognition results inconsistent inputs will produce a consistency score above the threshold, Th, and the results will be rejected.

More generally, durations of N components of sound may be used to generate a consistency score, S, as shown in (7) above by dividing by N. The following formulas show general techniques for determining consistency scores according to various embodiments following the example implementa tions presented above. The first formula is a general case of (7):

$$S = \frac{1}{N} \sum_{i=1}^{N} [(d_i) - (SR\mu_i)]^2,$$

where $d_i$ is the actual duration of the $i^{th}$ component (e.g., phone), SR is the speaker rate, $\mu_i$ is the average duration of the $i^{th}$ component as determined from a training corpus, for example.

As another example, actual durations and average durations of each component in the spoken utterance are converted to the log domain using delta values (3) and (4) or (5) and (6), and the average phone durations are normalized based on the speaker rate. The consistency score, S, uses average squared differences. In the following example implementation, a score of zero is perfect, and if the score is above some preset threshold, then the recognition result is rejected. The general form for multiple components is:

$$S = \frac{1}{N} \sum_{i=1}^{N} [\ln(d_i) - \ln(SR\mu_i)]^2.$$

Some components, such as phones, have more variation than others. In one embodiment, variations in component sounds may be taken into account by weighting the score for each phone, for example, by the standard deviation. In the following example, the score may be divided by the square of the standard deviation of the durations. Accordingly, a score, S, may be calculated from delta values similar to (3) and (4) using the generalized form for multiple components as follows:

$$S = \frac{1}{N} \sum_{i=1}^{N} \frac{[\ln(d_i) - \ln(SR\mu_i)]^2}{\sigma_i^2},$$

where $d_i$ is the actual duration of the $i^{th}$ component (e.g., phone), SR is the speaker rate, $\mu_i$ is the average duration of the $i^{th}$ component as determined from a training corpus, for example, and $\sigma_i^2$ is the standard deviation of the $i^{th}$ component as determined from a training corpus.

While the average of the log of the durations for a given phone is $\ln(\mu_i)$, the average duration for that phone is not precisely $\mu_i$. In one embodiment, an average number of frames for a particular phone may be included as part of the function operating on $\mu_i$. Accordingly, a score, S, may be calculated from delta values similar to (5) and (6) using a generalized form for multiple components as follows:

$$S = \frac{1}{N} \sum_{i=1}^{N} \frac{\left[\ln(d_i) - \ln\left(SR\mu_i e^{\frac{\sigma_i^2}{2}}\right)\right]^2}{\sigma_i^2}.$$

In some applications, the distribution of durations may be lognormal. Accordingly, the probabilities of each phone duration may be found (e.g., from a training corpus). A geometric average of these probabilities may be used to get an average probability for each phone, which may be calculated using the following formula:

$$S = \sqrt[N]{\prod_{i=1}^{N} \frac{1}{d_i \sigma_i \sqrt{2\pi}} e^{-\frac{[\ln(d_i) - \ln(SR\mu_i)]^2}{2\sigma_i^2}}}$$

In this case, both the actual input and the modified speaker rate are operated on by the same function, natural log ("ln (x)") and delta value of each component is operated on by the exponential function ("e(x)"), multiplied together, and the Nth root is taken on the result. This is one example of a geometric average.

The above examples are intended as illustrative of the many ways in which consistency may be determined to validate recognition results for duration. Other techniques for determining consistency duration, energy, and pitch may be used based on, among other things, the other predetermined consistency characteristics of the parameter (e.g., statistical parameters), particular recognition process, the particular application, and desired results. The above examples are not exhaustive and are not to limit the scope of the claims.

Validating the Recognition Result

As illustrated above, a consistency score may be determined, compared to a threshold, and validated if the score is below the threshold (or above the threshold, depending on how the consistency score is calculated). However, instead of validating the recognition result if the recognition result is above or below some threshold, the consistency score may be combined with the recognition score. In one example implementation, the consistency score is scaled and subtracted from a score for the recognition result, and a valid recognition result only occurs if the combined recognition score is above 0, for example, where a small consistency score corresponds to more consistent parameter. If the new combined score is below zero, then the recognition result may be rejected. In other embodiments, other thresholds and other combinatorial relationships between consistency scores with recognition scores may be used. In yet other embodiments, multiple consistency scores for multiple different parameters may be combined with a recognition score and used to validate the recognition score.

In some embodiments, a final recognition result may be validated, and in other embodiments, an intermediate recognition result may be validated. In the first case, a recognizer may be configured to recognize a plurality of words or phrases. The words, phrases, or other utterances the recognizer is configured to recognize are commonly referred to interchangeably as the recognition set or grammar or vocabulary. The recognizer may process a spoken utterance and output a final recognition result. Post processing of the result may include validating the result based on consistency as described above.

In another embodiment, instead of waiting all the way until the end of the recognition process, a recognition algorithm may check consistency at intermediate states. If an intermediate recognition result up to a particular state is not consistent with a speaker rate, then the intermediate result may be rejected. Rejecting invalid intermediate results earlier may be advantageous for at least two reasons. First, it reduces computational load, because the extra processing of an invalid intermediate result is skipped. Second, in some applications it may be more accurate. It may be that a highest scoring final result is inconsistent with a speaker rate, but there was an intermediate that had a score that was almost as good, but was consistent with a speaker rate. In this case, only the inconsistent final result made it to the end, and was then rejected based on consistency. In this case, nothing was returned, resulting is a false reject. If the system eliminating the final result earlier in the process, the more consistent intermediate result may now be the final result, which is validated based on consistency. One challenge with determining consistency and validating intermediate results is that there may not be a good estimate of the speaker rate early on in the utterance because not much has been heard yet. This makes it difficult to know whether the intermediate result is bad, and when it is safe to reject it. In one embodiment, the notion of a consistent speaker rate is modified. Instead of looking for a particular rate that the speaker could be speaking, a joint distribution of any number of phonemes is determined. For example, there may be a duration distribution of the $n^{th}$ phoneme based on all of the previous phonemes, and the duration of each phoneme may be scored based on that distribution.

Example Recognition Processes

In some embodiments, determining consistency and validating recognition results as described herein may be used in a phrase/word spotting recognition process. One example word or phrase spotting process is described in U.S. patent application Ser. No. 12/831,051, filed on Jul. 6, 2010, entitle "Systems and Methods for Hands Free Voice Control and Search", the entire disclosure of which is hereby incorporated herein by reference. As described above, duration, energy, or pitch may be used to post process final recognition results, which may be an output corresponding to recognition of a particular word or phrase that has been spotted in a stream of speech, or such parameters may be used to process intermediate results.

In other embodiments, determining consistency and validating recognition results as described herein may be used to improve selection of recognition results available based on a recognizer's particular recognition set. For example, a recognizer may return the N best results. If the recognizer has a command set consisting of commands A, B, C, D, E, and F, and if an utterance is received in the recognizer, then the top 3 results may be D, A, and E. A duration, energy, or pitch score may be calculated for D, A, and E, scaled, and added to the recognition scores for D, A, and E, for example. Whichever of the three then had the highest modified result based on the duration, for example, would be returned as the recognizer's answer. Therefore, in addition to using the duration, energy, or pitch to filter out false accepts in a phrase spotting recognizer, duration, energy, or pitch may be used to rescore the results to figure out which one is best. It is to be understood that the above described recognition processes are merely examples and do not limit the application of determining consistency of duration, energy, and/or pitch to other recognition processes.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. A method comprising:
receiving, by a computing device, a spoken utterance;
performing, by the computing device, speech recognition processing on the spoken utterance and generating a recognition result;
determining, by the computing device, consistency of duration of component sounds of the recognition result, the determining comprising:
calculating a speaker rate by dividing a total duration of the spoken utterance by a sum of expected durations for the component sounds of the recognition result;
for each component sound:
calculating a modified expected duration by multiplying the component sound's expected duration by the speaker rate; and
calculating a delta value corresponding to a difference between the component sound's duration in the spoken utterance and the component sound's modified expected duration; and
calculating a duration consistency score by taking a sum of squares of the delta values and dividing the sum by the total number of component sounds; and
validating, by the computing device, the recognition result based on the duration consistency score.

2. The method of claim 1 further comprising:
determining consistency of energy of the component sounds; and
generating an energy consistency score,
wherein the validating of the recognition result is further based on the energy consistency score.

3. The method of claim 2 further comprising:
determining consistency of pitch of the component sounds; and
generating a pitch consistency score,
wherein the validating of the recognition result is further based on the pitch consistency score.

4. The method of claim 1 wherein the recognition result is associated with a recognition score, and wherein validating the recognition result comprises combining the recognition score with the duration consistency score to generate a combined score and comparing the combined score to a threshold.

5. The method of claim 1 wherein the expected duration for each component sound is an average duration value that is generated from a speaker-independent training set of utterances.

6. The method of claim 1 wherein validating the recognition result comprises:
comparing the duration consistency score to a threshold;
rejecting the recognition result if the consistency of the parameter duration consistency score crosses the threshold; and
accepting the recognition result if the duration consistency score does not cross the threshold.

7. The method of claim 6 wherein if the duration consistency score crosses the threshold, then the durations of the component sounds are insufficiently consistent, and wherein if the duration consistency score does not cross the threshold, then the durations of the component sounds are sufficiently consistent.

8. The method of claim 1 wherein the component sounds are one of phonemes, sub-phones, syllables, and words.

9. A system comprising:
a processor; and
a non-transitory computer readable storage medium having stored thereon program code that, when executed by the processor, causes the processor to:
receive a spoken utterance;
perform speech recognition processing on the spoken utterance and generate a recognition result;
determine consistency of duration of component sounds of the recognition result, the determining comprising:
calculating a speaker rate by dividing a total duration of the spoken utterance by a sum of expected durations for the component sounds of the recognition result;
for each component sound:
calculating a modified expected duration by multiplying the component sound's expected duration by the speaker rate; and
calculating a delta value corresponding to a difference between the component sound's duration in the spoken utterance and the component sound's modified expected duration; and
calculating a duration consistency score by taking a sum of squares of the delta values and dividing the sum by the total number of component sounds; and
validate the recognition result based on the duration consistency score.

10. The system of claim 9 wherein the program code further causes the processor to:
determine consistency of energy of the component sounds; and
generating an energy consistency score,
wherein the validating of the recognition result is further based on the energy consistency score.

11. The system of claim 9 wherein the program code further causes the processor to:
determine consistency of pitch of the component sounds; and
generating a pitch consistency score,
wherein the validating of the recognition result is further based on the pitch consistency score.

12. The system of claim 9 wherein the expected duration for each component sound is an average duration value that is generated from a speaker-independent training set of utterances.

13. The system of claim 9 wherein validating the recognition result comprises:
comparing the duration consistency score to a threshold;
rejecting the recognition result if the duration consistency score crosses the threshold; and
accepting the recognition result if the duration consistency score does not cross the threshold.

14. A non-transitory computer readable storage medium having stored thereon program code executable by a processor, the program code comprising:
code that causes the processor to receive a spoken utterance;
code that causes the processor to perform speech recognition processing on the spoken utterance and generate a recognition result;
code that causes the processor to determine consistency of duration of component sounds of the recognition result, the determining comprising:
calculating a speaker rate by dividing a total duration of the spoken utterance by a sum of expected durations for the component sounds of the recognition result;
for each component sound:
calculating a modified expected duration by multiplying the component sound's expected duration by the speaker rate; and
calculating a delta value corresponding to a difference between the component sound's duration in the spoken utterance and the component sound's modified expected duration; and
calculating a duration consistency score by taking a sum of squares of the delta values and dividing the sum by the total number of component sounds; and
code that causes the processor to validate the recognition result based on the duration consistency score.

15. The non-transitory computer readable storage medium of claim 14 wherein the program code further comprises:
code that causes the processor to determine consistency of energy of the component sounds; and
code that causes the processor to generate an energy consistency score,
wherein the validating of the recognition result is further based on the energy consistency score.

16. The non-transitory computer readable storage medium of claim 14 wherein the program code further comprises:
determine consistency of pitch of the component sounds; and
generating a pitch consistency score,
wherein the validating of the recognition result is further based on the pitch consistency score.

17. The non-transitory computer readable storage medium of claim 14 wherein the expected duration for each component sound is an average duration value that is generated from a speaker-independent training set of utterances.

18. The non-transitory computer readable storage medium of claim 14 wherein validating the recognition result comprises:
comparing the duration consistency score to a threshold;
rejecting the recognition result if the duration consistency score crosses the threshold; and
accepting the recognition result if the duration consistency score does not cross the threshold.

* * * * *